United States Patent
Stählin et al.

(10) Patent No.: US 9,985,900 B2
(45) Date of Patent: May 29, 2018

(54) METHOD AND SYSTEM FOR DETERMINING A NUMBER OF VEHICLE-TO-X MESSAGES TO BE DISCARDED

(71) Applicants: Continental Teves AG & Co. oHG, Frankfurt (DE); Continental Automotive GmbH, Hannover (DE)

(72) Inventors: Ulrich Stählin, Eschborn (DE); Marc Menzel, Weimar (DE); Enno Kelling, Eschborn (DE); Martin Schürmeier, Regensburg (DE)

(73) Assignees: Continental Teves AG & Co. oHG (DE); Continental Automotive GmbH (DE)

( * ) Notice: Subject to any disclaimer, the term of this patent is extended or adjusted under 35 U.S.C. 154(b) by 30 days.

(21) Appl. No.: 15/036,905

(22) PCT Filed: Dec. 3, 2014

(86) PCT No.: PCT/EP2014/076346
§ 371 (c)(1),
(2) Date: May 16, 2016

(87) PCT Pub. No.: WO2015/090957
PCT Pub. Date: Jun. 25, 2015

(65) Prior Publication Data
US 2016/0301615 A1    Oct. 13, 2016

(30) Foreign Application Priority Data

Dec. 16, 2013 (DE) .................. 10 2013 226 117
Dec. 19, 2013 (DE) .................. 10 2013 226 605

(51) Int. Cl.
*H04L 12/823* (2013.01)
*H04W 4/04* (2009.01)
(Continued)

(52) U.S. Cl.
CPC .......... *H04L 47/32* (2013.01); *B60R 16/0315* (2013.01); *H04L 67/12* (2013.01);
(Continued)

(58) Field of Classification Search
None
See application file for complete search history.

(56) References Cited

U.S. PATENT DOCUMENTS 8,451,812 B2    5/2013 Stahlin
8,909,927 B2    12/2014 Falk
(Continued)

FOREIGN PATENT DOCUMENTS

DE    102007053255    5/2009
DE    102008060231    6/2009
(Continued)

OTHER PUBLICATIONS

German Search Report for German Application No. 10 2013 226 605.7 dated Mar. 31, 2014, including partial translation.
(Continued)

*Primary Examiner* — Kibrom T Hailu
(74) *Attorney, Agent, or Firm* — RatnerPrestia

(57) ABSTRACT

A method for determining a number of vehicle-to-X messages to be discarded, wherein a work cycle of a vehicle-to-X communication unit involves vehicle-to-X messages being received, wherein the work cycle involves a number of received vehicle-to-X messages being determined, wherein the work cycle involves an existent computation power being available and wherein the work cycle involves the number of vehicle-to-X messages to be discarded being determined on the basis of the number of received vehicle-to-X messages. The invention additionally relates to a corresponding system and to a use for the system.

14 Claims, 2 Drawing Sheets

(51) Int. Cl.
*H04L 29/08* (2006.01)
*B60R 16/03* (2006.01)
*H04W 4/02* (2018.01)
*H04W 84/18* (2009.01)

(52) U.S. Cl.
CPC .......... *H04W 4/023* (2013.01); *H04W 4/046* (2013.01); *H04W 84/18* (2013.01)

(56) References Cited

U.S. PATENT DOCUMENTS

| | | | |
|---|---|---|---|
| 8,922,390 B2 | 12/2014 | Stahlin | |
| 2008/0095163 A1* | 4/2008 | Chen | H04L 45/16 370/392 |
| 2011/0080302 A1* | 4/2011 | Muthaiah | H04L 47/10 340/903 |
| 2011/0140968 A1 | 6/2011 | Bai | |
| 2011/0238987 A1* | 9/2011 | Kherani | H04L 1/0041 713/168 |
| 2013/0165146 A1 | 6/2013 | Stahlins | |
| 2014/0020098 A1 | 1/2014 | Stahlin | |
| 2014/0140353 A1 | 5/2014 | Stahlin | |
| 2014/0143834 A1 | 5/2014 | Stahlin | |

FOREIGN PATENT DOCUMENTS

| | | |
|---|---|---|
| DE | 102010002092 | 12/2010 |
| DE | 102009045748 | 4/2011 |
| DE | 102010038640 | 2/2012 |
| DE | 102011079052 | 3/2012 |
| DE | 102012204880 | 10/2012 |
| DE | 102011078704 | 1/2013 |
| DE | 102011107111 | 1/2013 |

OTHER PUBLICATIONS

International Search Report and Written Opinion of the International Searching Authority for International Application No. PCT/EP2014/076346 dated Feb. 6, 2015.

* cited by examiner

METHOD AND SYSTEM FOR DETERMINING A NUMBER OF VEHICLE-TO-X MESSAGES TO BE DISCARDED

CROSS REFERENCE TO RELATED APPLICATIONS

This application is the U.S. National Phase Application of PCT International Application No. PCT/EP2014/076346, filed Dec. 3, 2014, which claims priority to German Patent Application No. 10 2013 226 117.9, filed Dec. 16, 2013 and German Patent Application No. 10 2013 226 605.7, filed Dec. 19, 2013, the contents of such applications being incorporated by reference herein.

FIELD OF THE INVENTION

The invention relates to a method for determining a number of vehicle-to-X messages to be discarded, a system for determining a number of vehicle-to-X messages to be discarded, and a use of said system.

BACKGROUND OF THE INVENTION

Vehicle-to-X communication systems which are suitable for information transmission both between different vehicles (vehicle-to-vehicle communication) and between vehicles and infrastructure installations (vehicle-to-infrastructure communication) are already known in the prior art. Both variants are usually grouped under the generic term vehicle-to-X communication. Vehicle-to-X communication in general has the problem that, unlike conventional surround sensors, for instance, the number of detected objects or the number of received vehicle-to-X messages is subject to strong variations. Thus typically between ten and several hundred vehicle-to-X messages are received per second. A corresponding amount of computing power must therefore always be held in reserve. In order to keep this reserve as low as possible, it is also known to use what are known as preprocessing techniques in order to discard irrelevant vehicle-to-X messages after receipt as early as possible in the processing chain. Computing power can hence be saved.

DE 10 2010 038 640 A1, which is incorporated by reference describes in this connection a device and a method for vehicle-to-X communication. The disclosed method is based on a combination of communication technologies, each of which is different and has different properties. A first communication channel can be implemented e.g. as a mobile communications channel, whereas a second communication channel is implemented as a WLAN channel. Which information is sent over which communication channel is determined by originator-based sorting of the information to be sent. According to DE 10 2010 038 640 A1, periodically occurring or static information is transmitted over the first channel, whereas safety-relevant information is transmitted over the second channel.

DE 10 2008 060 231 A1, which is incorporated by reference describes a method for selecting various data transmitted by means of vehicle-to-X communication. The various data received are classified by a data filter in the receiver on the basis of a data frame and forwarded, for example, to a driver assistance system or an entertainment unit. This is a simple way of allowing the received data to be sorted before actually being processed.

DE 10 2010 002 092 A1, which is incorporated by reference describes data preprocessing for received vehicle-to-X messages, which preprocessing precedes forwarding of the messages to the associated applications and systems in the vehicle and processing of same by these applications and systems. Said data preprocessing can comprise checking an integrity level of the message and additionally performing data reduction. The data reduction causes information about certain objects or situations to be suppressed and hence said information is not forwarded and processed. Thus, for instance, information about objects located too far from the receiving vehicle or information about objects that are only reached by the vehicle after a certain period of time, is ignored. Likewise, a large number of spatially close objects having fundamentally the same response to a situation are combined e.g. into a traffic jam. It is also possible to take account solely of objects located in the intended channel of movement of the vehicle. The amount of data to be processed by the individual applications can thereby be reduced.

DE 10 2012 204 880 A1, which is incorporated by reference discloses a method for reducing the computational load in a data integrity check of data packets received by means of vehicle-to-X communication. The data integrity check here consists of checking a signature encrypted using cryptographic algorithms, which check is associated with a large amount of computing power and requires the use of dedicated electronics. In order to reduce the computational load, the received vehicle-to-X messages are first preprocessed to prioritize said messages under different categories. This prioritization can be performed using different criteria, such as, for instance, the distance of the originator from the recipient, or the TTC (time to collision) of the originator to the recipient.

SUMMARY OF THE INVENTION

The methods known from the prior art, however, have the disadvantage that in determining the number of vehicle-to-X messages to be discarded or processed, they do not take sufficient account of the computing power actually available. Hence according to the prior art it is always necessary to keep computing power in reserve.

An aspect of the invention proposes a preprocessing technique for received vehicle-to-X messages that is better matched to the available computing power.

An aspect of the invention relates to a method for determining a number of vehicle-to-X messages to be discarded, wherein in an operating cycle of a vehicle-to-X communication unit, vehicle-to-X messages are received, wherein in the operating cycle a number of received vehicle-to-X messages is determined, wherein in the operating cycle an available computing power is provided, and wherein in the operating cycle the number of vehicle-to-X messages to be discarded is determined on the basis of the number of received vehicle-to-X messages. This achieves the advantage that the available computing power need not be designed on the basis of holding comparatively large reserves of computing power, because as the number of received vehicle-to-X messages increases, increasingly more vehicle-to-X messages are discarded, i.e. the number of vehicle-to-X messages to be discarded likewise rises. Thus this allows the use of comparatively less computationally powerful and hence cheaper electronic computing modules for processing the received vehicle-to-X messages. In addition, the method according to the invention generally makes better use of the available computing power because, as explained, there is no need to hold in reserve what is generally unused.

The method according to an aspect of the invention is preferably implemented by or in a recipient of the vehicle-to-X messages. It is particularly preferred in this case if both the recipient and the originator(s) of the vehicle-to-X messages are motor vehicles.

For the purpose of the invention, the term "operating cycle" is understood to mean an operating sequence of the vehicle-to-X communication unit, which sequence may comprise a plurality of steps such as, for instance, receiving the vehicle-to-X messages, determining the number of received vehicle-to-X messages, determining the number of vehicle-to-X messages to be discarded, and processing vehicle-to-X messages.

In particular, the number of vehicle-to-X messages to be discarded is actually determined solely on the basis of the number of received vehicle-to-X messages. This achieves the advantage that the method according to the invention is particularly simple and efficient in terms of computing power.

In addition, the method according to an aspect of the invention is advantageously performed in conjunction with preprocessing techniques known per se. For example, the method according to the invention can be integrated or incorporated in the known preprocessing techniques or coupled to said preprocessing techniques in such a way that it influences or controls a classification of the received vehicle-to-X messages performed by the known preprocessing techniques, and does so in such a way that the number of vehicle-to-X messages classified as "to be discarded" is adjusted in accordance with the method according to the invention. The actual classification, however, is still performed by the known preprocessing technique.

In general, the computing power to be expended for the method according to an aspect of the invention or the computing power to be expended during execution of the method according to the invention increases with the number of received vehicle-to-X messages and in particular with the number of vehicle-to-X messages to be processed. Conversely, as the number of received vehicle-to-X messages decreases, and in particular as the number of vehicle-to-X messages to be processed decreases, the computing power to be expended decreases.

The sum of the number of vehicle-to-X messages to be processed and the number of vehicle-to-X messages to be discarded equals the number of received vehicle-to-X messages.

As already explained, the number of vehicle-to-X messages to be discarded increases as the number of received vehicle-to-X messages rises. Conversely, the number of vehicle-to-X messages to be discarded decreases as the number of received vehicle-to-X messages falls. Preferably in each case this occurs substantially in proportion to the number of received vehicle-to-X messages.

It is advantageous that the vehicle-to-X message is transmitted and/or received by means of at least one of the following connection types:
WLAN connection, in particular in compliance with IEEE 802.11p;
ISM connection (Industrial, Scientific, Medical band);
Bluetooth® connection;
ZigBee connection;
UWB connection (Ultra Wide Band);
WiMax® connection (Worldwide Interoperability for Microwave Access);
infrared connection; and
mobile communications connection.

These connection types offer various advantages here depending on the form, wavelength and data protocol used. Thus some of the listed connection types enable e.g. a relatively high data transmission rate and allow a connection to be established relatively quickly, whereas others are by far the best suited to data transmission around line-of-sight obstructions. Further advantages can be achieved by combining and using simultaneously or in parallel a plurality of these connection types, because this can also compensate for disadvantages of individual connection types.

It is preferably provided that classification parameters of a preprocessing technique are adapted in the operating cycle in such a way that the determined number of vehicle-to-X messages to be discarded leaves behind a number of vehicle-to-X messages to be processed that uses the available computing power in the operating cycle without exceeding this computing power. By adapting the classification parameters of a preprocessing technique, in particular of a preprocessing technique known per se, the number of vehicle-to-X messages to be discarded or processed can be adjusted in a relatively simple manner using the method according to the invention. Hence the method according to the invention, by adapting the classification parameters, therefore intervenes in a preprocessing technique known per se. Nonetheless, it can be advantageous to keep a relatively small amount of computing power in reserve in order to avoid requiring too much computing power and hence possibly creating system instabilities if, for instance, the number of received vehicle-to-X messages or the number of vehicle-to-X messages to be discarded is determined incorrectly.

It is advantageous that the classification parameters are adapted by adapting threshold values. Said threshold values can be the deciding factor, for example, in assigning a vehicle-to-X message to a specific classification grade such as "to be analyzed" or "to be discarded", for instance. This presents a particularly simple and effective way of adjusting the number of vehicle-to-X messages to be discarded.

It is also advantageous that the classification parameters are adapted by adapting applied relevance criteria. Relevance criteria may be, for example, a direction of arrival of the vehicle-to-X message, an age of the vehicle-to-X message or a type of the vehicle-to-X message. The more relevance criteria that are applied here and/or the narrower the employed relevance criteria are selected, the more the number of vehicle-to-X messages to be discarded can be increased.

It is advantageous in particular that the classification parameters are adapted differently for different communication-based assistance systems. The different requirements of the different communication-based assistance systems can thereby be taken into account. Safety-critical communication-based assistance systems are in this case preferably constrained less by discarding vehicle-to-X messages relevant to said systems than are non safety-critical communication-based assistance systems.

In addition, it is advantageous in particular that the classification parameters comprise a distance of an originator of a vehicle-to-X message from a recipient of the vehicle-to-X message. In this case, the greater the distance of the originator of the vehicle-to-X message from the recipient of the vehicle-to-X message, the more likely the vehicle-to-X message will be classified as "to be discarded". Likewise, it is particularly advantageous that the classification parameters comprise a receive field strength of the vehicle-to-X message. In this case, the lower the receive field strength of the vehicle-to-X message, the more likely the vehicle-to-X message will be classified as "to be discarded".

Furthermore, it is advantageous in particular that the classification parameters comprise a creation time of the vehicle-to-X message. The creation time specifies the age of the vehicle-to-X message. In this case, the further in the past that the creation time of the vehicle-to-X message lies, i.e. the older the vehicle-to-X message, the more likely the vehicle-to-X message will be classified as "to be discarded".

In addition, it is advantageous in particular that the classification parameters comprise a direction from which the vehicle-to-X message was received. The further the direction from which the vehicle-to-X message was received deviates from the projected direction of travel of the recipient, the more likely the vehicle-to-X message may be classified as "to be discarded", for instance.

It is also advantageous in particular that the classification parameters comprise a direction of an event described in the vehicle-to-X message. The further the direction of the event described in the vehicle-to-X message deviates from the projected direction of travel of the recipient, the more likely the vehicle-to-X message may be classified as "to be discarded", for instance.

Finally, it is advantageous in particular that the classification parameters comprise a number of relay processes from the originator of the vehicle-to-X message to the recipient of the vehicle-to-X message. For the purpose of the invention, the term "originator" is understood to mean here the original sender and not a repeater station or relay transmitter that receives and then retransmits, i.e. relays, the vehicle-to-X message. These repeater stations or relay transmitters are usually motor vehicles but may also be infrastructure installations. The greater the number of relay processes from the originator of the vehicle-to-X message to the recipient of the vehicle-to-X message, the more likely the vehicle-to-X message will be classified as "to be discarded".

Determining the number of vehicle-to-X messages to be discarded is preferably performed in an electronic computing unit that works independently of an electronic computing unit implementing the communication-based assistance systems. Hence this therefore guarantees isolation between the physical processing of the vehicle-to-X messages in, or for, the communication-based assistance systems and the physical preprocessing in the sense of the method according to the invention. This achieves the advantage that the often safety-critical communication-based assistance systems can be implemented independently of the method according to the invention. An external attack on the vehicle-to-X communication unit, for example a "denial of service" attack, hence affects only that electronic computing unit in which is determined the number of vehicle-to-X messages to be discarded. It is thus possible to avoid any impairment in the function of the communication-based assistance systems in such a situation. Since the communication-based assistance systems continue to be operational, they can even detect and report the attack. Instead of physical partitioning into separate computing units, the two functions can also be segregated into separate partitions of a computing unit, in which case the operating system of the computing unit must guarantee this functionality and ideally meets a fixed target of available computing time per partition.

An aspect of the invention also relates to a system for determining a number of vehicle-to-X messages to be discarded, comprising a vehicle-to-X communication unit and at least one electronic computing unit, wherein the vehicle-to-X communication unit receives in an operating cycle vehicle-to-X messages, wherein the system is designed to determine in the operating cycle a number of received vehicle-to-X messages, wherein the electronic computing unit provides in the operating cycle an available computing power, and wherein the system is designed to determine in the operating cycle the number of vehicle-to-X messages to be discarded on the basis of the multiplicity of received vehicle-to-X messages. The system according to the invention hence facilitates the implementation of the method according to the invention, resulting in the advantages already described.

The at least one electronic computing unit is preferably integrated in the vehicle-to-X communication unit and is part of the vehicle-to-X communication unit. At least one second electronic computing unit is preferably integrated independently of the first electronic computing unit and in particular not integrated in the vehicle-to-X communication unit. At least the second electronic computing unit advantageously implements communication-based assistance systems. As already described earlier, the isolation can also be performed by software partitions in a computing unit.

There is provision for the system according to an aspect of the invention to be designed to implement the method according to the invention. The system according to the invention comprises all necessary means therefor.

An aspect of the invention also relates to using in a motor vehicle the system according to the invention.

BRIEF DESCRIPTION OF THE DRAWINGS

Further preferred embodiments are given in the dependent claims and the following descriptions of exemplary embodiments with reference to figures,
in which:

DETAILED DESCRIPTION OF THE PREFERRED EMBODIMENTS

Figure 1:
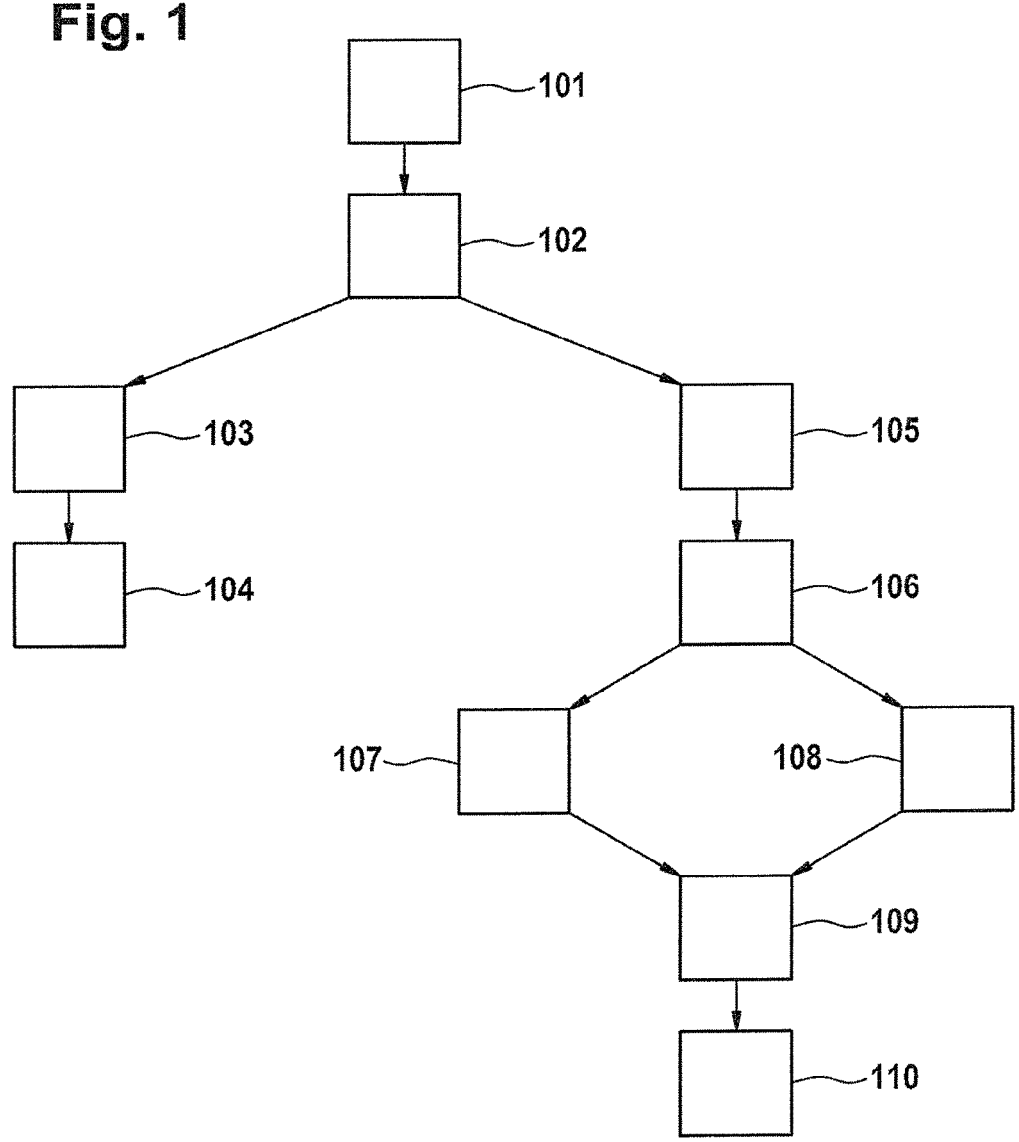
FIG. 1 shows an example sequence of the method according to the invention in the form of a flow diagram.

FIG. 1 shows an example sequence of the method according to an aspect of the invention in the form of a flow diagram. In step 101, first a number of vehicle-to-X messages is received by a vehicle-to-X communication unit in a motor vehicle. The vehicle-to-X communication unit comprises, inter alia, an electronic computing unit, which in each operating cycle provides an available computing power. In the subsequent method step 102, the number of received vehicle-to-X messages is then determined. This is done, for example, by means of an algorithm designed for this purpose, which is executed by the electronic computing unit. If, in step 103, it is established that the number of received vehicle-to-X messages is so low that the computing power required to process said messages would not exceed the available computing power, then the method according to the invention is terminated for this operating cycle in step 104. If however, in step 105, it is established that the computing power required to process the number of received vehicle-to-X messages would exceed the available computing power, then the number of vehicle-to-X messages to be discarded is determined in step 106. Vehicle-to-X messages to be discarded are not subject to further processing, for example, and accordingly also do not need any additional computing power. The number of vehicle-to-X messages to be discarded is based on the available computing power, with the aim being to use as much as possible of the available computing power but not to exceed it. Thus the number of vehicle-to-X messages to be discarded can be determined on the basis of the number of received vehicle-to-X messages, taking into account the computing power available in the operating cycle. Hence once the number of vehicle-to-X messages to be discarded has been determined, the number of vehicle-to-X messages to be discarded is increased in step 107 by adapting classification parameters in the form of threshold values of a known preprocessing technique. For this purpose, the threshold values are adapted such that a larger number of vehicle-to-X messages than before is classified as "to be discarded". The threshold values are, for example, a distance of an originator of vehicle-to-X messages from the recipient of the vehicle-to-X messages, i.e. from the vehicle-to-X communication unit, and an age of the vehicle-to-X messages. By reducing the threshold values for the distance and for the age, more vehicle-to-X messages than before are therefore classified as "to be discarded". At the same time as step 107, in step 108 classification parameters in the form of relevance criteria of the known preprocessing technique are adapted, thereby likewise increasing the number of vehicle-to-X messages to be discarded. The applied relevance criteria may be, for example, a direction from which the vehicle-to-X messages are received and a type of the vehicle-to-X messages. By adapting these relevance criteria such that additional directions and types of vehicle-to-X messages as classification parameters produce the result "to be discarded", the number of vehicle-to-X messages to be processed is reduced further, or in other words the number of vehicle-to-X messages to be discarded is increased further. The described known preprocessing technique is a preprocessing process known per se, which is known in the prior art and performs the function of classifying or preprocessing received vehicle-to-X messages to the effect that an electronic computing unit must expend relatively little computing power to process the remaining or preprocessed vehicle-to-X messages. The method according to the invention hence intervenes partly in the known preprocessing process by controlling the classification parameters of said process. Then, in step 109, the vehicle-to-X messages classified as "to be discarded" are discarded, which means, for example, that they are deleted without further processing. In method step 110, the vehicle-to-X messages classified as "to be processed" are processed further by the electronic computing unit and, where required, forwarded to the relevant communication-based assistance systems.

Figure 2:
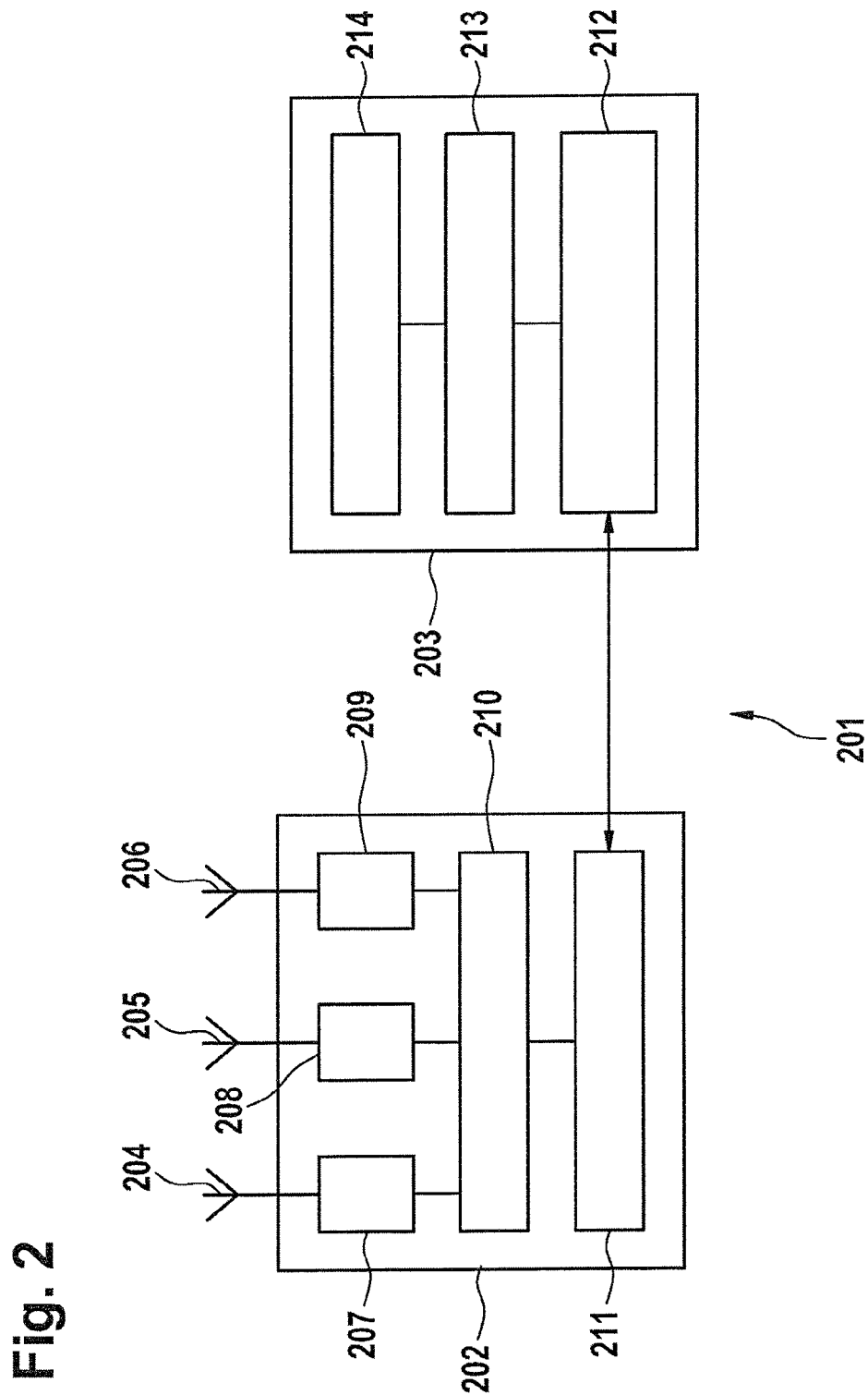
FIG. 2 shows by way of example a function block diagram of a system according to an aspect of the invention.

FIG. 2 shows by way of example a function block diagram of system 201 according to an aspect of the invention. System 201 comprises communication block 202 and application block 203. Communication block 202 and application block 203 each comprise a dedicated, mutually independent electronic computing unit. Communication block 202 also comprises WLAN antenna 204, GPS antenna 205 and mobile communications antenna 206. Vehicle-to-X messages are received and transmitted by WLAN antenna 204 and mobile communications antenna 206, whereas GPS antenna 205 is used exclusively to receive GPS signals. Attached to each of antennas 204, 205 and 206 are associated readout means 207, 208 and 209 respectively. Readout means 207 and 209 are also able to create vehicle-to-X messages, which can then be transmitted by WLAN antenna 204 and mobile communications antenna 206 respectively. Readout means 207, 208 and 209 are functionally coupled to media access controller 210, which is also known as the "MAC layer". Media access controller 210 is in turn functionally coupled to function block 211, which constitutes the method according to the invention. After received vehicle-to-X messages have passed through function block 211 in their processing chain, the vehicle-to-X messages to be processed are routed to network layer 212 of application block 203. Network layer 212 routes the vehicle-to-X messages to be processed to data management block 213, which finally forwards said messages to communication-based assistance systems 214.

The invention claimed is:

1. A method for determining a number of vehicle-to-X messages to be discarded, the method comprising:
   receiving, by a receiver of a vehicle, vehicle-to-X messages in an operating cycle of a vehicle-to-X communication transceiver;
   determining, by an electronic computing device of the vehicle, a received number of vehicle-to-X messages in the operating cycle;
   determining, by the electronic computing device of the vehicle, that processing the received number of vehicle-to-X messages in the operating cycle would exceed an available computing power of the electronic computing device;
   determining, by the electronic computing device of the vehicle, in the operating cycle a selected number of the vehicle-to-X messages to discard such that a remaining number of the vehicle-to-X messages can be processed without exceeding the available computing power of the electronic computing device;
   discarding the determined number of vehicle-to-X messages; and
   controlling a communication-based driver assistance system of the vehicle based on at least one of the remaining number of vehicle-to-X messages.

2. The method as claimed in claim 1, wherein classification parameters of a preprocessing technique are adapted in the operating cycle in such a way that the determined number of vehicle-to-X messages to be discarded leaves behind a number of vehicle-to-X messages to be processed that uses the available computing power in the operating cycle without exceeding this computing power.

3. The method as claimed in claim 2, wherein the classification parameters are adapted by adapting threshold values.

4. The method as claimed in claim 2, wherein the classification parameters are adapted by adapting applied relevance criteria.

5. The method as claimed in claim 2, wherein the classification parameters are adapted differently for different communication-based driver assistance systems.

6. The method as claimed in claim 2, wherein, the classification parameters comprise a distance of an originator of a vehicle-to-X message from a recipient of the vehicle-to-X message.

7. The method as claimed in claim 2, wherein the classification parameters comprise a receive field strength of the vehicle-to-X message.

8. The method as claimed in claim 2, wherein the classification parameters comprise a creation time of the vehicle-to-X message.

9. The method as claimed in claim 2, wherein the classification parameters comprise a direction from which the vehicle-to-X message was received.

10. The method as claimed in claim 2, wherein the classification parameters comprise a direction of an event described in the vehicle-to-X message.

11. The method as claimed in claim 2, wherein the classification parameters comprise a number of relay processes from the originator of the vehicle-to-X message to the recipient of the vehicle-to-X message.

12. The method as claimed in claim 1, wherein determining the number of vehicle-to-X messages to be discarded is performed by another electronic computing device that works independently of the electronic computing device implementing the communication-based driver assistance systems.

13. A system for determining a number of vehicle-to-X messages to be discarded, comprising:
    a vehicle-to-X communication transceiver of a vehicle; and
    at least one electronic computing device of the vehicle,
    wherein the vehicle-to-X communication transceiver receives in an operating cycle, a number of vehicle-to-X messages,
    wherein the electronic computing device is configured to:
        determine that the received number of vehicle-to-X messages in the operating cycle would exceed an available computing power of the electronic computing device,
        determine in the operating cycle a selected number of the received vehicle-to-X messages to discard such that a remaining number of the vehicle-to-X messages can be processed without exceeding the available computing power of the electronic computing device,
        discard the determined number of vehicle-to-X messages, and
        control a communication-based driver assistance system of the vehicle based on at least one of the remaining number of vehicle-to-X messages.

14. The system as claimed in claim 13, wherein the system is designed to implement a method for determining the number of vehicle-to-X messages to be discarded, comprising:
    receiving vehicle-to-X messages in an operating cycle of the vehicle-to-X communication transceiver, and
    determining a number of received vehicle-to-X messages in the operating cycle,
    wherein in the operating cycle an available computing power is provided, and
    wherein in the operating cycle the number of vehicle-to-X messages to be discarded is determined on the basis of the number of received vehicle-to-X messages.

* * * * *